United States Patent [19]
Snellman

[11] 3,734,577
[45] May 22, 1973

[54] TRACK ASSEMBLY FOR ENDLESS TRACK VEHICLES

[75] Inventor: Donald L. Snellman, Seattle, Wash.
[73] Assignee: Norfin, Inc., Seattle, Wash.
[22] Filed: Nov. 16, 1970
[21] Appl. No.: 89,822

[52] U.S. Cl. .................... 305/40, 305/49, 305/43
[51] Int. Cl. ........................................ B62d 55/24
[58] Field of Search .............. 305/38, 37, 40, 35 EB, 305/49, 43

[56] References Cited

UNITED STATES PATENTS

| | | | |
|---|---|---|---|
| 2,596,919 | 5/1952 | Smith | 305/38 |
| 2,487,813 | 11/1949 | Knox | 305/38 |
| 3,480,339 | 11/1969 | Kell | 305/35 EB |
| 2,378,427 | 6/1945 | Myers | 305/38 |
| 2,392,988 | 1/1946 | Keck | 305/38 |
| 3,063,758 | 11/1962 | Fikse | 305/43 X |
| 3,598,454 | 8/1971 | Richards | 305/35 EB |
| 3,606,921 | 9/1971 | Grawey | 152/354 |

*Primary Examiner*—Richard J. Johnson
*Attorney*—Seed, Berry & Dowrey

[57] ABSTRACT

A track assembly for endless track vehicles is disclosed utilizing endless, elastomeric-sheathed, elastomer-impregnated glass fiber cable structures on which are strung individual track sections composed of a lug unit and a shoe plate unit. Each of the lug units includes passageways extending transversely of the length dimension thereof for receiving the continuous sheathed cable structures. The lug units are held in spaced apart relation from each other by integral, regularly spaced elastomeric projections extending laterally from the sides of the cable structures. The shoe plate units are secured to each of the lug units and hold the sheathed cable structures in position in the passageways without substantial compressive loading of the cable structures. The elastomeric sheath is bonded to the elastomer impregnated cables, substantially eliminating relative movement between the cables and the surrounding sheath. A load exerted on any individual track section by the drive sprocket of the track vehicle is shared with the adjacent track sections. Movement between the track sections is limited to that within the elastic limit and below the tear limit of the sheath and cables embedded in the sheath. Each of the lug units is provided with means forming a mechanical stop which prevents flexing of the cables beyond their elastic limit and means for engaging the drive sprocket of the vehicle through which vehicle drive forces are transmitted to the track assembly. Integral rails projecting from each of the lug units transversely of their length dimension and substantially parallel to the passageways for the cable structures extend beyond the opposite sides of the lug units and are engageable with the rails of adjacent lug units to limit lateral movement of the track sections relative to each other.

10 Claims, 9 Drawing Figures

PATENTED MAY 22 1973 3,734,577
SHEET 1 OF 4
FIG—1
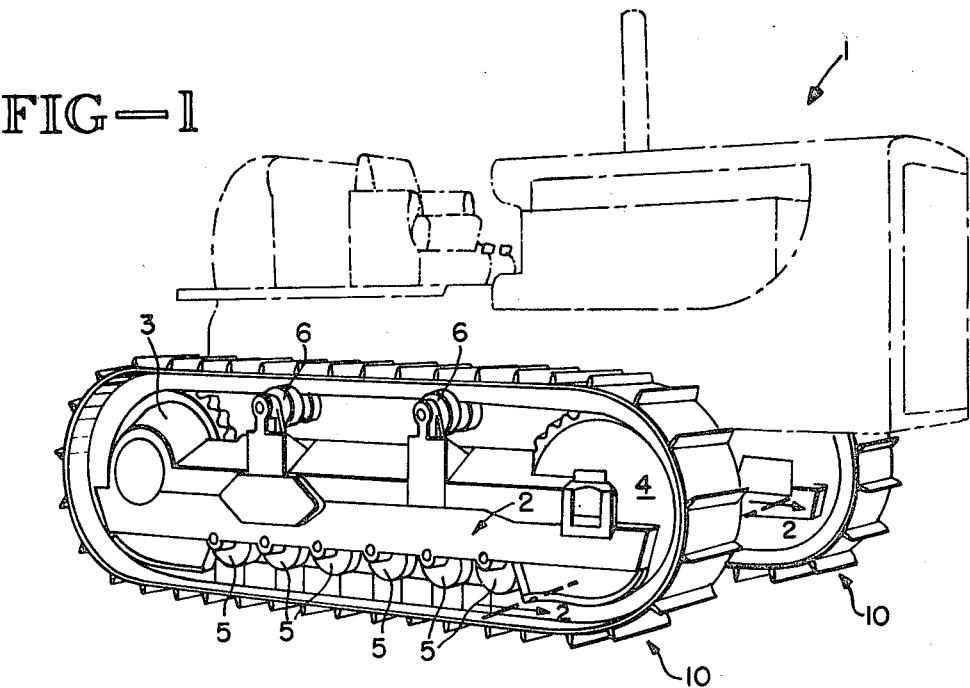
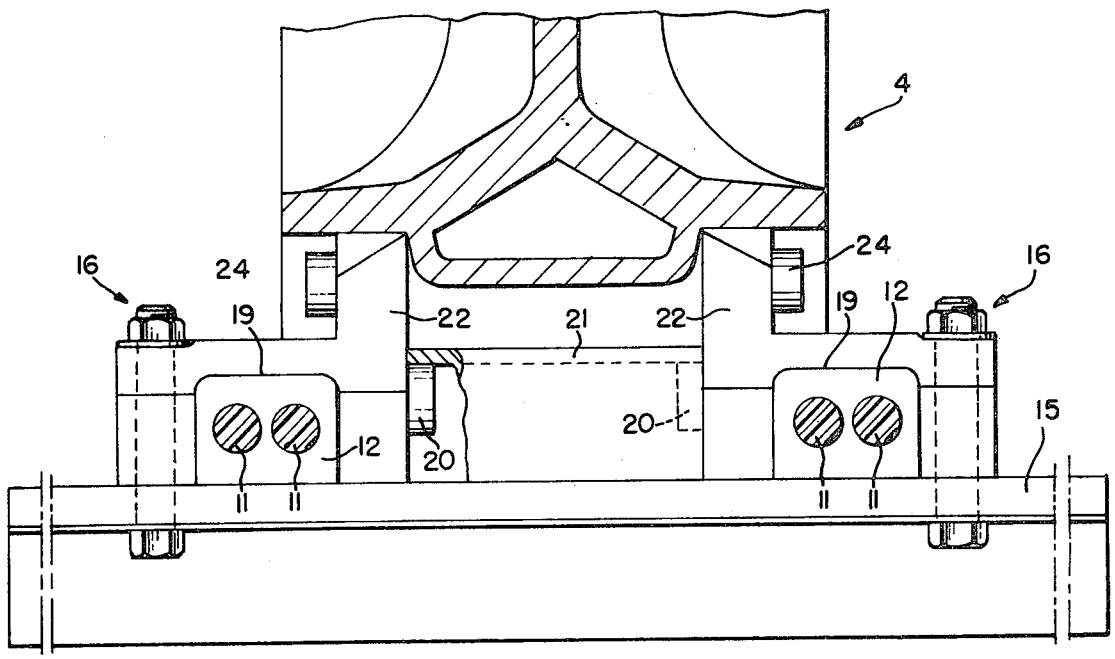
FIG—2
INVENTORS
DONALD L. SNELLMAN
BY
Seed, Berry & Dowrey
ATTORNEYS

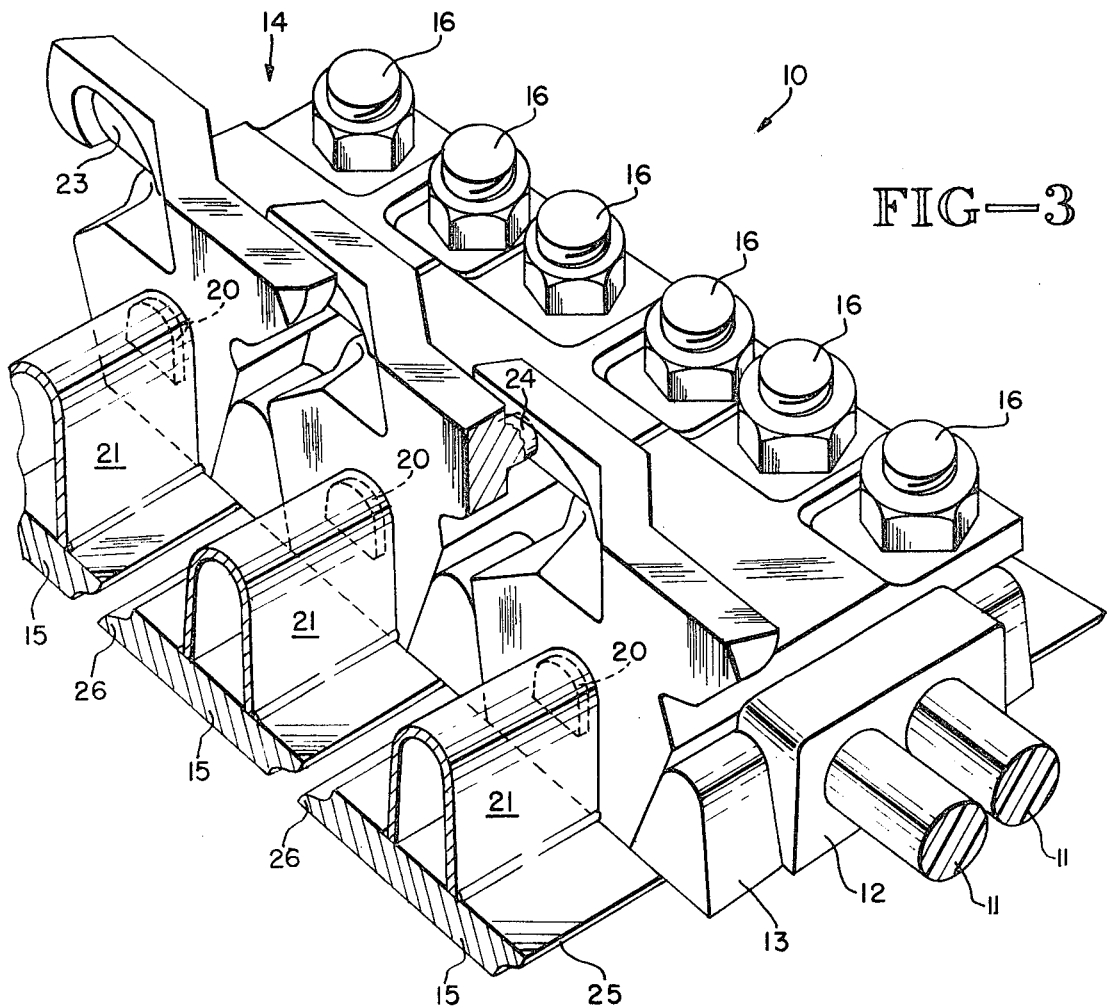

TRACK ASSEMBLY FOR ENDLESS TRACK VEHICLES

BACKGROUND OF THE INVENTION

1. Field of the Invention

This invention relates to a track assembly for endless track vehicles and to the individual track sections making up the track assembly.

2. Prior Art Relating to the Disclosure

Track assemblies for endless track vehicles in common use today consist of a roller chain assembly engaged by the drive sprocket wheel of the vehicle. Shoes provided with grousers are bolted to the chain links to provide the bed for traction. Flexing of the chain around the drive sprocket wheel of the vehicle is permitted by movement of roller pinions within collars fastened to the chain links. Each of these roller pinions and collars become individual wear points during use of the track assembly. As each of these individual points wear the sum total of their wear substantially increases the total track length of the track assembly to the point where it is thrown from the vehicle drive and/or idler wheels and must be replaced.

Attempts have been made to string track sections along endless cables to overcome the problems associated with conventional track assemblies mentioned above. Due to expense, elongation of the cables and other problems, track assemblies strung along endless cables have not become commercially feasible. Patents disclosing track assemblies utilizing endless cables include the following: U.S. Pat. Nos. 1,230,504; 1,956,472; 2,063,762; 2,402,042; 2,845,308 and 3,063,758.

To overcome problems of elongation of the cables used in endless track assemblies a coreless, elastomer-impregnated glass fiber cable has been developed which, when embedded in and bonded to a continuous, outer elastomeric sheath, provides the required flexibility and strength necessary for tying track sections together. Such cables are not subject to substantial elongation to a degree that track performance and durability can be extended beyond that normally possible for conventional track systems. These glass fiber cables, their method of manufacture and their use in the manufacture of endless track vehicles are disclosed in co-pending application Ser. No. 718, filed Jan. 5, 1970, in the names of Donald L. Snellman and Willard G. Hudson, assigned to the assignee of this application.

SUMMARY OF THE INVENTION

This invention relates to a track system for endless track vehicles and to the individual track sections making up the track system. Each of the track sections consist of a lug unit and a grousered shoe plate. The individual track sections are strung along endless, elastomeric-sheathed, cable structures. The continuous elastomeric sheath surrounding the cables has, at regularly spaced intervals, a plurality of projections extending laterally from the sides thereof, these projections acting as spacers to locate and provide sockets for the individual track sections which enclose the elastomeric-sheathed cable structures as well as protect the metal track sections from metallic contact and wear. The lug units of each track section are elongated members having open-ended passageways extending therethrough for receipt of the sheathed cable structures. The upper surfaces of the passageways are bevelled to form convex surfaces relative to the width dimension of the track units, each having a radius of curvature approximating the pitch diameter of the vehicle drive sprocket over which the track assembly is mounted. Each lug unit is also provided with integral rails extending transversely of the length dimension of the lug unit and substantially parallel to the passageways, the respective ends of the rails extending beyond the opposite sides of the lug unit and engageable with the rails of adjacent lug units to limit lateral movement of the track sections relative to each other. The rails of adjacent lug units are adapted to interlock and thereby resist lateral movement of the track sections. The upper surface of each of the rails is flat and dimensioned to the recesses of the rollers, carriers, and idler wheels of the vehicle on which the track assembly is mounted. The rails on adjacent lug units may be provided with respective projecting studs and complimentary recesses whereby to interlink the lug units together and provide a positive mechanical stop means for resisting loading of the track system tending to flex the track and associated cable structures in reverse.

The objects of this invention are:

1. to provide a track system for endless track vehicles employing endless elastomeric-sheathed cable structures along which are strung individual track sections composed of a lug unit and a grousered shoe unit;
2. to provide a track system for endless track vehicles which can be utilized by existing vehicles without modification;
3. to provide a track system for endless track vehicles wherein the lug unit and grousered shoe unit of each individual track section are enclosed about the continuous sheathed cable structures without substantial compressive loading of the cable structures;
4. to provide a track system for track vehicles wherein the grousers of the grousered shoe units are offset from the central axis thereof so that, when they are secured to the respective lug units, the moment of rotation caused by the offset mounting aids in preventing the sheathed cable structures from slipping relative to the track section;
5. to provide a track system for endless track vehicles wherein the individual track sections enclosed around the sheathed cable structures are maintained a predetermined distance from each other by integral elastomeric projections extending laterally from the sides of the sheathed cable structures;
6. to provide a track system for endless track vehicles wherein all of the lug and grousered shoe units making up each of the track sections are, respectively, of the same size and shape and wherein the lug units can be forged and the grousered shoe units can be rolled;
7. to provide a track system for endless track vehicles which, cost wise, is competitive with existing track systems and whose performance and durability is much improved over conventional track systems;
8. to provide a track system wherein mechanical stop means integral with each of the lugs and/or grousered shoe units interact with adjacent lug and/or grousered shoe units to prevent flexing of the cables embedded in and bonded to the continuous elastomeric sheath beyond their elastic limits.

9. to provide a track system for endless track vehicles which is relatively noisefree in operation due to the elastomeric spacers between the individual track sections; and 10. to provide a track system wherein loading of an individual track section by the drive sprocket of the vehicle about which the track is trained is shared by adjacent track sections with relative movement between the track sections and the elastic sheath limited to that within the elastic limit and short of the tear limit of the sheath and with substantially no relative movement between the elastomeric sheath and the embedded cables.

BRIEF DESCRIPTION OF THE DRAWINGS

FIG. 1 is a perspective view of a vehicle employing the track assembly of this invention;

FIG. 2 is a cross sectional view of a track section and cable structures along section line 2—2 of FIG. 1;

FIG. 3 is a perspective view of a portion of the track assembly including the sheathed cable structures, lug units and grousered shoe plates;

DESCRIPTION OF THE PREFERRED EMBODIMENT

Figure 9:
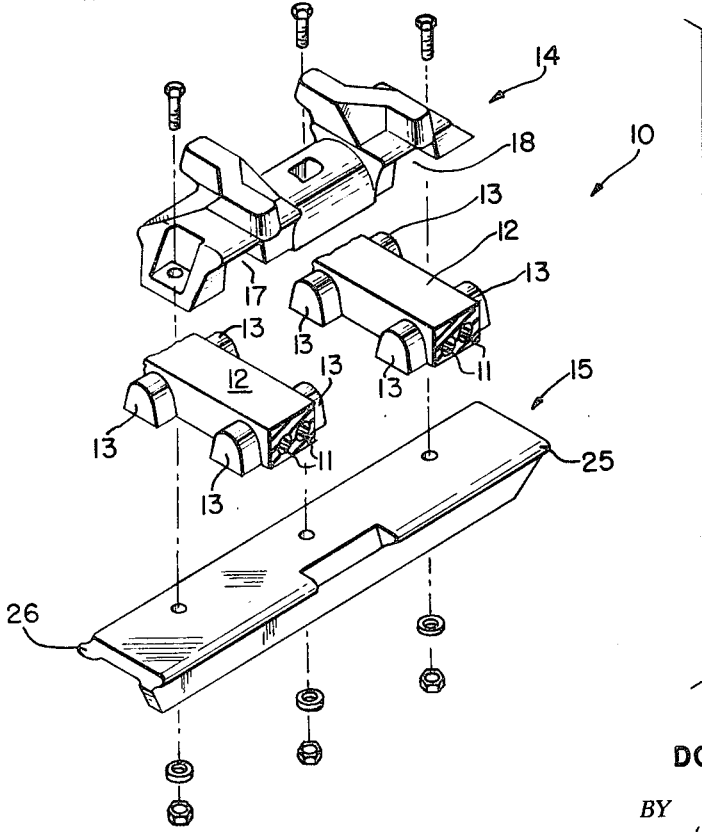
FIG. 9 is a perspective view of the track assembly of FIG. 4 shown in exploded relationship.

FIG. 1 shows a conventional tractor 1 having an under carriage frame 2. At the back end of the frame a drive sprocket wheel 3 is mounted for rotation and at the forward end of the frame a carrier wheel 4 is mounted for rotation. Between the drive sprocket wheel 3 and the carrier wheel 4 are a plurality of track rollers 5 mounted for rotation relative to the undercarriage frame 2. Idler rollers 6 are also provided. Around the drive sprocket wheel, carrier wheel, track rollers and idler rollers is trained an endless track 10 movable over the plurality of track rollers, idler rollers, and carrier wheel. The endless track is driven by the sprocket wheel 3 which transmits power from the power means of the tractor to the track. The track assembly 10 includes a plurality of individual track sections strung along endless, flexible cable structures. The cable structures consist of one or more cables having high tensile strength and low elongation properties embedded in and bonded to an elastomeric sheath. Preferred are elastomer-impregnated glass fiber cables made as disclosed in application Ser. No. 718, filed Jan. 5, 1970, entitled "Glass Fiber Cable, Method of Making, and Its Use in the Manufacture of Track Vehicles" hereby incorporated by reference. The preferred elastomeric material for the outer sheath of the cables is an elastomeric polyurethane which is durable under the conditions to which the track is subjected. Other elastomeric materials may also be employed. Elastomeric polyurethanes and other suitable elastomeric materials are commercially available. Glass fiber cables provide great strength and flexibility and have elongation characteristics significantly better than steel cable. To prolong the effective life of glass fiber cables the individual glass fibers making up the cables must be kept free of abrasive rubbing against each other and not subjected to extreme flexing as this causes fracture of the individual filaments making up the cables. Referring to FIG. 3 and FIG. 9 coreless, elastomer-impregnated glass fiber cables 11, made in accordance with the disclosure of application Ser. No. 718 are sheathed and bonded to a continuous elastomeric cushion 12. The elastomeric cushion (1) protects the cables from contortion under load and enables the cables to resist damage from excess wear, shock loading and shear, (2) protects the cables from direct contact with the individual track sections, and (3) prevents contact of the cables with foreign materials such as rock, sand or other abrasive materials. The elastomer cushion, as shown, is substantially rectangular in shape; however, differently designed cushions may be employed depending on the design of the track sections.

The elastomeric cushion is provided with integral, elastomeric projections 13 extending laterally from each of the vertical sides of the cushion 12 at regularly spaced intervals. These projections serve as spacers to locate and provide sockets for the lug units which enclose the elastomeric cable structures. The elastomeric projections also serve to separate the individual lug units of the individual track sections to prevent metal to metal contact and wear. Separation between the track sections also results in quiet operation of the track assembly in contrast to the noisy operation of conventional track assemblies. The projections are shaped so that angular displacement of the individual track sections enclosed around the cable structures, as they travel around the drive sprocket 3 or the carrier wheel 4, compresses the projections and transmits horizontal compressive forces to the embedded glass fiber cables resisting their radial distortion as they flex into the radius of the drive sprocket or carrier wheel.

A lug unit 14 and grousered shoe plate 15 enclose the sheathed cables between each of the projections 13. The lug unit and grousered shoe plate are bolted or otherwise secured together by suitable means 16. The lug units which encase the elastomeric cable structures provide a means of attachment for the grousered shoe plates, provides means through which the drive sprocket 3 is able to drive the track assembly, and provides a base for the attachment of integral rails upon which the track rollers and idler rolls ride to support the vehicle on its track bed. Two different designs of lug units are illustrated by FIGS. 2 and 3, and FIGS. 4 to 9 respectively. The lug unit of FIGS. 4 to 9 can be forged as a single piece whereas each lug unit of FIG. 2 and 3 includes three separate pieces. Each of the lug units is provided with parallel, open-ended passageways 17 and 18 extending transversely of the length dimension of the unit. The passageways are shaped to correspond with the outer contour of the elastomeric cable structures. The passageways are sized such that when the lug units are encased around the elastomeric cable structures and the grousered shoe plates 15 secured thereto, the cables embedded in the elastomeric sheath 12 are not subjected to substantial compressive forces. The inner side surfaces 19a of the passageways are made to bow outwardly as shown in FIG. 7 a small amount-not enough to pinch or compress the cable structures substantially. The double curvature of the side walls aids in preventing slippage of the cable structures in that extrusion of the sheath 12 of the cable structures would have to result before slippage could occur. The width of each of the lug units is approximately the distance between the projections 13 extending laterally from each side of the elastomeric cushion 12. The upper surfaces 19 of each of the passageways are contoured relative to the width of the lug units to a radius of curvature substantially equal to the radius of an arc segment of the drive sprocket and carrier wheel about which the track assembly is to be trained. The contoured surfaces provide a bed for the cable structures which is circumferential as the track assembly flexes around the drive sprocket 3 and the carrier wheel 4 and eliminated angular flexion of the cable structures which would occur if the surfaces were flat, thus avoiding undue flexing of the cables and minimizing the possibility of fracture of individual filaments making up the cables.

The respective ends 18 and 19 (see FIG. 3) of each of the lug units may be bevelled as shown to allow space for the bases of the lug sections to move closer together as they flex about drive sprocket 3 and carrier wheel 4. Spacing of the lug units is controlled by the projections 13 integral with the elastomeric cable structures.

As differentiated from the lug unit design of FIGS. 4 to 9, the lug units of FIGS. 2 and 3 include semi-circular studs 20 extending from the inner side surfaces of the units. These semi-circular studs fit into the open ends of a semi-circular hollow sprocket piece 21. The legs of the sprocket pieces 21 are welded to the grousered shoe plates 15 as shown in FIGS. 2 and 3. The sprocket pieces are adapted to fit in the valleys between the sprockets of the drive sprocket 3.

The lug unit of FIGS. 4 to 9 is a one-piece member wherein the sprocket piece 21 is integral with the remainder of the unit. The lug unit is bolted to the grousered shoe plate at three or more points as shown in FIG. 9 or secured thereto by other suitable means.

Integral with each of the lug units are rails 22 projecting upwardly from each side of the body of the lug unit and extending transversely of the body and substantially parallel to the passageways 17 and 18. The ends of the rails extend beyond the opposite ends of the lug unit. As shown the forward end of the rail on each lug unit is laterally offset from the opposite end of the rail so that the rails on adjacent lug units can be interlocked to resist lateral forces tending to laterally displace a track section from its adjacent section. The top surfaces of the rails 22 are flat. The width of the interlocking rails is dimensioned to fit in the recesses of the track rollers 5, idler rollers 6 and carrier wheel 4.

The rails on each of the lug units may be provided with a stud and recess to interlink adjacent lug units. As shown in FIGS. 2 and 3 one end of the rail of a lug unit may be provided with a recess 23 in the side surface thereof and the other end of the rail provided with a projecting stud 23. on the opposite side surface. This interlinking feature provides a positive means of resisting the effects of reverse flexing and loading of the track assembly when projecting objects are encountered in the path of travel of the vehicle. The projecting studs on the rails of each unit are sized to interlink and interlock with the recesses of adjacent rails of an adjacent lug unit. By reverse flexing is meant flexing of the track assembly opposite its direction of flexing as the track travels around the drive sprocket and carrier wheel of the vehicle. Reverse flexing causes high vertical shear loads to be exerted on the cable structures at points between adjacent track sections. Reverse track flexing is resisted when the reverse bend radius lengthens the distance between adjacent track sections to a point where contact of the rail stud is made with the mating wall of the recess. This contact resists further kinking of the adjacent track sections and reverse bending of the cable structures and thereby prevents damaging vertical shear effects to the cable structures. In addition the interlinking rails provide a secondary linkage to hold the track sections together even if the primary linking system, the endless cable structures, fails because of accidental causes or from wear. This secondary linkage can maintain the integrity of the track sections to prevent jumping of the track from the vehicle undercarriage and allow the vehicle to be operated until such time as the track can be repaired or replaced. This secondary track linkage is not to be considered a permanent linkage but will enable the vehicle to perform limited temporary service such as completing a shift operation or traveling to a place of repair where the track assembly can be replaced or repaired.

The grousered shoe plates 15 which are secured to the underside of each of the lug units generally extend lengthwise beyond the ends of the lug units. The forward side of each shoe plate includes an integral projecting shoulder 24 extending the length of the plate. The rearward side of each plate also includes a projecting shoulder 24 which extends beneath and overlaps with the forward projecting shoulder 24 of an adjacent plate, providing a mechanical stop which prevents reverse flexing of the cable structures beyond a predetermined amount as shown in FIG. 6.

Each of the lug units and each of the grousered shoe plates making up the track assembly of FIG. 4 to 9 are identical. The lug units can be fabricated by forging methods and the grousered shoe plates fabricated by rolling. Likewise the respective lug units and grousered shoe plates making up the track assembly of FIGS. 2 and 3 are identical. Referring to FIG. 9 the track assembly is put together by securing the cable structures in the passageways of each of the lug units at spaced intervals between the spaced projections 13 on the cable structures. Grousered shoe plates 15 are then secured to the lower surfaces of the lug units and bolted or otherwise secured. It is preferred that little compressive force be exerted on the cable structures by the lug units during bolting of the lug units to the grousered shoe plates. By minimizing the compressive forces exerted on the cable structures damage to the glass fiber cables by fracture is minimized.

In the event that certain track section become damaged and need repair the individual track sections can be replaced by a new unit without undue time or expense. Each of the track sections can be separated from the remainder of the sections and unbolted and removed with ease.

Figure 4:
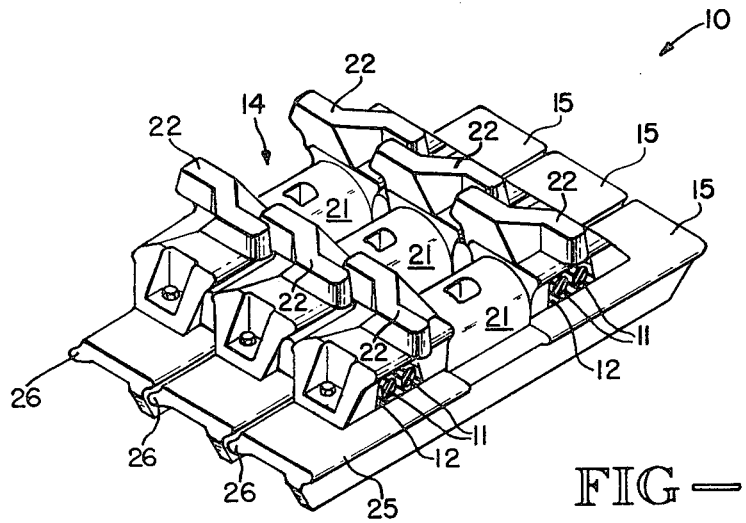
FIG. 4 is a perspective view of a portion of a modified track assembly design employing similar concepts to the track assembly of FIG. 3.
Figure 5:
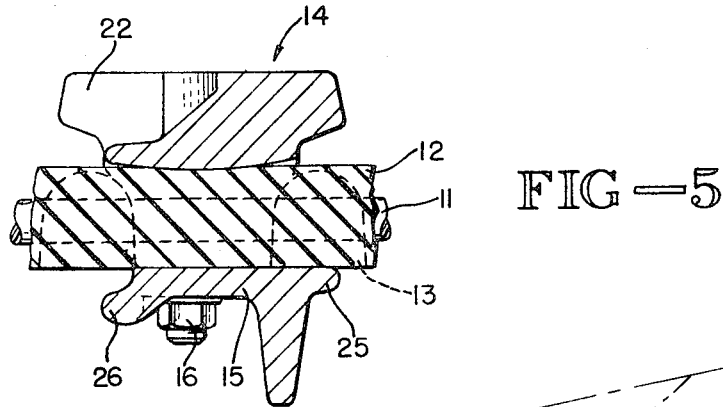
FIG. 5 is a cross sectional view of a single track section of the track assembly of FIG. 4.
Figure 6:
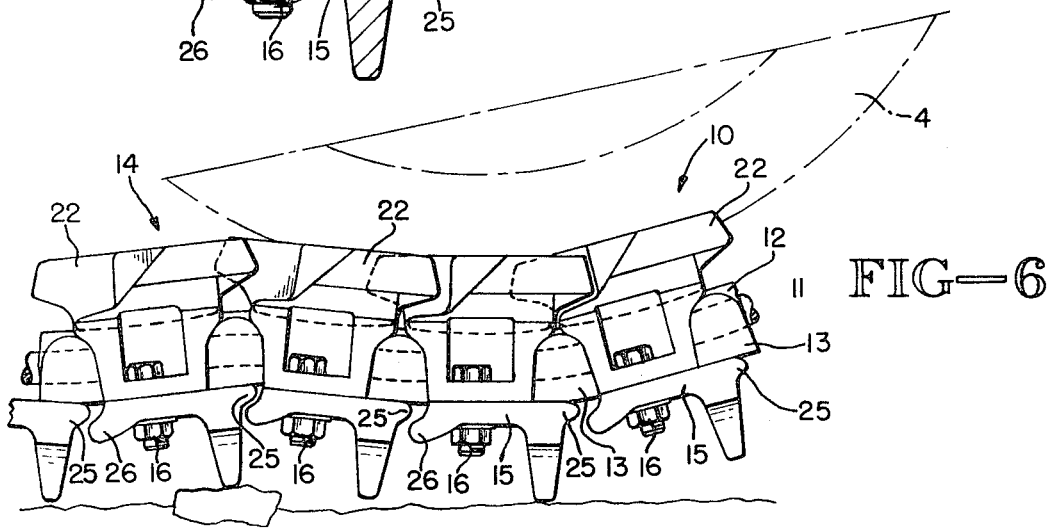
FIG. 6 is a side view illustrating the functioning of the mechanical stop means as the track assembly is flexed in one direction about the drive or carrier wheels of the vehicle and flexed in the opposite or reverse direction in encountering a protruding obstacle in the path of the vehicle.
Figure 7:
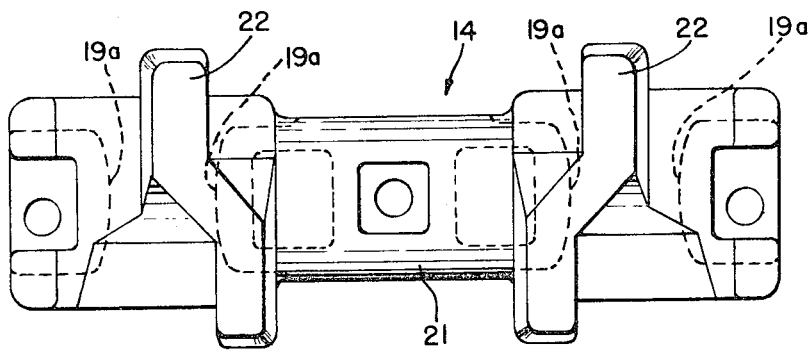
FIG. 7 is a plan view of the lug unit of the track section of FIG. 4.
Figure 8:
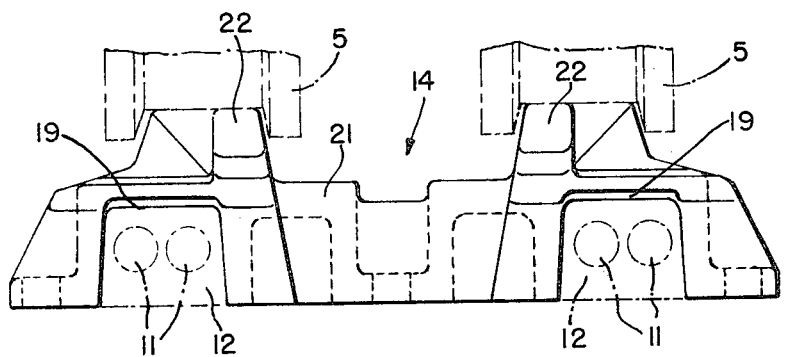
FIG. 8 is a front view of the lug unit of FIG. 7 illustrating the position of the integral rails of the lug unit relative to the idler roller of the vehicle on which the track assembly is mounted.

Referring to FIGS. 5 and 6, it is preferred that the grouser on each of the shoe plates 15 be offset from a center line extending the length dimension thereof. This serves at least two purposes. As the track moves from ground contact upward about carrier wheel 4 the separating movement of the grousers effected by their tilting releases dirt packed between them to effect automatic cleaning. Further the offset mounting of the grousers causes each of the track sections to have a moment of rotation about their centers of gravity causing the lug units to bite into the elastomeric sheath of the cable structures a predetermined amount. The bite of the lug units against the elastomeric sheath of the cable structures caused by the offset mounting of the grouser plates aids in preventing slippage of the cable structures through the individual track sections.

In U.S. Pat. No. 3,063,758 (FIG. 31) individual track sections are clamped about an elastomer block through which a cable is extended. The cable, however, is not bonded to the sheath. Resilient projections of the elastomer block cushion contact between the adjacent track sections. When an individual track section is put under load by the drive sprocket of the vehicle, the track section is forced into contact with the adjacent track section and the adjacent track section into contact with its adjacent track section, and so on. Slippage occurs, however, between the cable and the elastomer block with the result that a compressive load is exerted on the cable behind the drive sprocket of the vehicle with slack occurring in the track behind the drive sprocket. By the term "cable behind the drive sprocket" is meant that portion of the cable which has passed around the drive sprocket and is between the drive sprocket and the carrier wheel.

In the track assembly of this invention the cable or cables are bonded to the elastomeric sheath. There is thus little or no relative movement between the sheath and cable. Movement is limited to the distance between the individual track sections and this is calculated to be within the elastic limit and short of the tear limit of the elastomeric sheath. The load transmitted to the cable by the drive sprocket through the lug unit of the track section and the elastomeric sheath is reacted back along the cables not as a compressive load as is true with the design described in U.S. Pat. No. 3,063,758 but as a tension load. The cable or cables are thus pulled about the drive sprocket and not pushed, thus obviating the problem of slack in the track assembly.

The elastomeric-sheathed cable structures have a predetermined tear strength. As described each of the lug units is provided with mechanical stop means which interact with adjacent units to prevent the cable structures from being flexed beyond their limit. Thus, before the ultimate tear strength of the cables is reached the mechanical stop means on the lug units interact preventing the cables from being damaged.

The embodiments of the invention in which a particular property or privilege is claimed are defined as follows:

1. An endless track assembly for a track vehicle comprising:
   primary linking means for the track assembly extending circumferentially thereof including one or more endless, flexible cables of linear dimensional stability under normal loading conditions and of high tensile strength embedded within and bonded to a continuous, unbroken, elastomeric sheath having integral elastomeric projections extending laterally therefrom on both sides at regularly spaced intervals,
   a plurality of track sections, each including (1) a lug unit having means to grip the elastomeric sheath of the linking means yet not subject the imbedded cables of the linking means to substantial compressive loading, and (2) shoe plates secured together around the linking means, the track sections disposed in side-by-side relationship between the laterally extending projections on the linking means, the integral elastomeric projections of the linking means separating the track sections from one another and, as the track assembly travels around a drive sprocket of the track vehicle, the track sections compressing the projections and transmitting horizontal compressive forces to the imbedded cables of the linking means, resisting their radial distortion, and means on each of the track sections interacting with adjacent track sections preventing flexing of the imbedded cables beyond their elastic limit opposite their directions of flexing as the track assembly travels around the drive sprocket and carrier wheel of the vehicle.

2. The track assembly of claim 1 wherein the cables are made up of elastomer-impregnated glass fibers.

3. The track assembly of claim 1 wherein each shoe plate includes an integral grouser on the underside thereof extending transversely of the direction of travel of the track assembly and offset from a mid-line extending the length dimension of the shoe plate sufficiently to provide a moment of rotation about the center of gravity of each track section on contact of the grouser thereof with a work surface to cause the lug unit and shoe plate to grip the linking means and prevent slipping thereof through the lug unit and shoe plate.

4. An endless track assembly for a track vehicle comprising:
   a pair of primary linking means disposed side-by-side in parallel planes, each linking means including one or more endless, flexible, elastomer-impregnated glass fiber cables embedded within and bonded to a continuous, unbroken, elastomeric sheath having integral elastomeric projections extending laterally therefrom on both sides at regularly spaced intervals,
   a plurality of track sections strung in side-by-side relationship on the linking means, each track section composed of a lug unit of greater length than width secured around the linking means between the laterally extending projections thereof, and extending transversely to the length dimension of the linking means, and a grousered shoe plate secured to the lug unit without substantial compressive loading of the embedded cables therein, each lug unit including (1) parallel passageways for receiving the linking means therein with the upper surfaces thereof beveled to form convex surfaces, each having a radius of curvature approximating the radius of curvature of an arc segment of a vehicle drive sprocket about which the track assembly is to be trained, thereby avoiding flexing damage to the embedded cables as they travel around the drive sprocket, (2) integral rails projecting upwardly and transversely thereof substantially parallel to the passageways having their respective ends extending beyond the opposite sides of the lug unit and coacting with the rails of an adjacent lug unit to limit relative lateral movement of the track sections (3) mechanical stop means of adjacent lug units to prevent flexing of the embedded cables beyond their elastic limit and (4) means on the lug unit for engaging a vehicle drive sprocket through which the track vehicle drive forces are transmitted to the track assembly.

5. The track assembly of claim 4 wherein the top surfaces of the rails are flat and of a width to fit the recesses of a carrier wheel, track roller and idler wheel of a conventional endless track vehicle.

6. The track assembly of claim 5 wherein one end of the rail is provided with a laterally extending stud and the other end of the rail is provided with a complementary recess, the stud and recess of each lug unit adapted to coact with studs and recesses of adjacent lug units to provide a positive mechanical stop means resisting loading of the embedded cables tending to flex the embedded cables beyond their elastic limit.

7. A track section of an endless series of units forming a continuous track assembly strung along primary linking means composed of one or more endless, flexible elastomer-impregnated glass fiber cables embedded within and bonded to a continuous, unbroken, elastomeric sheath having integral elastomeric projections extending laterally therefrom on both sides at regular spaced intervals, comprising:
    a lug unit of greater width than length having a plurality of parallel, open ended passageways extending transversely of the length dimension thereof for receiving the linking means therein, the top surfaces of the passageways beveled to form convex surfaces each having a radius of curvature approximating the radius of curvature of an arc segment of a vehicle drive sprocket about which the track assembly is to be trained,
    integral rails projecting upwardly from the lug unit substantially parallel to the passageways, the respective ends of the rails extending beyond the opposite sides of the lug unit and adapted to overlap or coact with the rails of an adjacent lug unit to hold the lug unit rigidly interconnected in a common plane against pressure exerted in a lateral direction, and
    a grousered shoe plate secured to the underside of the lug unit, the shoe plate coacting with the lug unit to hold the linking means in parallel passageways and provide a lower surface adapted to contact a work surface over which the track section is run.

8. The track section of claim 7 wherein each of the side surfaces of the parallel passageways are beveled to form convex outer surfaces which grip the linking means yet do not subject the embedded cables therein to substantial compressive forces.

9. The track section of claim 7 wherein the grouser of each shoe plate extends transversely of the direction of travel of the track assembly and is offset from the mid-line of the plate relative to the length dimension thereof sufficiently to provide a moment of rotation about the center of gravity of the track section on contact of the grouser with a work surface to cause the lug unit and shoe plate to grip the linking means and prevent slippage thereof.

10. An endless track assembly for a track vehicle comprising:
    one or more endless flexible cables of linear dimensional stability under normal loading conditions and of high tensile strength embedded within and bonded to a continuous, unbroken elastomeric sheath having elastomeric projections extending laterally therefrom at regularly spaced intervals,
    a plurality of track sections secured around the sheath in-side-by-side relation between the laterally extending projections without substantial compression loading of the embedded cables, the distance between the track sections being such that load exerted on one of the track sections by a drive sprocket of a track vehicle is transmitted to the adjacent track sections before relative movement occurs between the track section and the sheath and before the tear strength of the sheath is exceeded, thereby maintaining the endless cable under tension over its length.

* * * * *